Patented May 24, 1927.

1,630,129

UNITED STATES PATENT OFFICE.

REX DE ORE McDILL, OF WINTER HAVEN, FLORIDA.

PROCESS OF PRESERVING FRUIT.

No Drawing.    Application filed October 21, 1921. Serial No. 509,394.

This invention is an improvement in a preservative for fruits and relates particularly to dissolved and emulsified paraffine applied to the external part of fresh fruit. Paraffine has been used as an external coating for fruit but has not been successful commercially due to the fact that it solidifies quickly from its molten state by contact with objects at a temperature below its melting point and further when objects are immersed in pure paraffine they pick up as thick a crust as is congealed on the object by the difference in temperature in the object and the paraffine. For example if a cold orange is immersed in a bath of melted paraffine it will take on a coating about one-eighth of an inch in thickness which renders it unattractive and unsalable to the ordinary consumer.

A feature of my invention is the combining of the paraffine with a volatile solvent like gasoline giving to it the consistency of a salve, in order that it may be spread on the fruit, mechanically by brushes or other similar means. It has been found that the solvent quickly passes off into the atmosphere leaving a coating of pure paraffine on the fruit which is thin and transparent and cannot be detected by the eye but of sufficient thickness to prevent evaporation of moisture from within and inhibit the inoculation of molds and decay organisms from without.

The coating preparation is prepared as follows: Pure refined commercial paraffine is used, known to the refiners as refined slab paraffine or wax and which is produced from petroleum in three different grades known as low, medium and high melting point. These paraffines melt at the following temperatures on the Fahrenheit scale; low 120°–122°, medium 124°–126°, high 130°–134°. Any of these paraffines or combination of same may be used. The paraffine is melted in a retort or open vessel and while in the melted state gasoline or other solvent is added in the proportion found most suitable for the fruit to be treated and the atmospheric temperature during the treating process. The amount of solvent used is also governed by the melting point of the paraffine used, that is the higher the melting point of the paraffine used the more solvent is used to give it the required consistency. This variation of the amount of solvent used ranges from 5% to 60% of the finished product by weight. In some cases it is found necessary to emulsify the dissolved paraffine in order to prevent the too rapid evaporation of the solvent while the preparation is being applied. This is done as follows; a pound of gum acacia is dissolved in a gallon of water to which eleven pounds of resin soap is added, the mixture being heated and agitated until the soap and gum are dissolved, the mixture is then put into an emulsifier and rapidly beaten until a porous fluffy state is obtained. To this is slowly added during the beating process a mixture of one hundred pounds of paraffine melted and disolved in six gallons of gasoline. The mixture is then well beaten until slightly cool and is then poured off into air tight receptacles for future use.

This substance has all of the advantages of pure paraffine and none of its disadvantages and can be applied at normal atmospheric temperature by mechanical means.

I claim:

1. The process of preserving fruit consisting in forming an encasing film thereon by applying thereto a mixture of paraffine and a volatile solvent of paraffine.

2. The process of preserving fruit consisting in forming an encasing film thereon by applying thereto a mixture of paraffine and gasoline.

3. The process of preserving fruit consisting in forming an encasing film thereon by brushing on the fruit a mixture of paraffine and a volatile solvent of paraffine.

4. The process of treating fruit to preserve its fresh condition and appearance and to enhance its keeping qualities, which comprises coating the same with a mixture of paraffine and gasoline.

5. The process of treating citrus fruit to preserve its fresh condition and appearance and to enhance its keeping qualities, which comprises rubbing the surface of the fruit with a semi-liquid or pasty mixture of a waxy material and a volatile liquid.

6. The process of treating citrus fruit to preserve its fresh condition and appearance and to enhance its keeping qualities, which comprises rubbing the surface of the fruit with a semi-liquid or pasty mixture of paraffine and gasoline.

7. The herein described process for preserving fruit in its natural state consisting in melting paraffine, adding a volatile solvent thereto in the proportion found most suitable for the fruit to be treated at the atmospheric temperature during the treating process, emulsifying the dissolved paraffine by the addition of soaps and gums, whereby to prevent the too rapid evaporation of the solvent and applying the resulting compound to the fruit to be preserved.

REX DE ORE McDILL.